United States Patent
Zou et al.

(10) Patent No.: US 9,301,250 B2
(45) Date of Patent: Mar. 29, 2016

(54) METHOD AND DEVICE FOR HANDLING CELL OUTAGE

(71) Applicant: HUAWEI TECHNOLOGIES CO., LTD., Shenzhen (CN)

(72) Inventors: Lan Zou, Shanghai (CN); Kai Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 407 days.

(21) Appl. No.: 13/661,494

(22) Filed: Oct. 26, 2012

(65) Prior Publication Data

US 2013/0053024 A1 Feb. 28, 2013

Related U.S. Application Data

(63) Continuation of application No. PCT/CN2011/073380, filed on Apr. 27, 2011.

(30) Foreign Application Priority Data

Apr. 30, 2010 (CN) .......................... 2010 1 0169453

(51) Int. Cl.
*H04L 12/26* (2006.01)
*H04W 52/02* (2009.01)
(Continued)

(52) U.S. Cl.
CPC .......... *H04W 52/0206* (2013.01); *H04W 24/04* (2013.01); *H04W 88/08* (2013.01); *H04W 92/20* (2013.01); *Y02B 60/50* (2013.01)

(58) Field of Classification Search
CPC ..................................................... H04L 12/26

USPC ....................................................... 370/241.1
See application file for complete search history.

(56) References Cited

U.S. PATENT DOCUMENTS

2010/0222059 A1 9/2010 Pani et al.

FOREIGN PATENT DOCUMENTS

| CN | 17267730 | 1/2006 |
|---|---|---|
| CN | 1984424 | 6/2007 |

(Continued)

OTHER PUBLICATIONS

"3$^{rd}$ Generation Partnership Project; Technical Specification Group Services and Systems Aspects; Telecommunication management; Self-Organizing Networks (SON) Policy Network Resource Model (NRM) Integration Reference Point (IRP); Information Service (IS) (Release 9)", 3GPP TS 32.522 V9.0.0, Mar. 2010, 22 pages.

(Continued)

*Primary Examiner* — Huy C Ho
(74) *Attorney, Agent, or Firm* — Staas & Halsey LLP

(57) ABSTRACT

Embodiments of the present invention provide a method and device for handling a cell outage. The method for handling a cell outage includes: receiving, by a first base station, an energy saving activation message sent by a second base station when a cell outage happens to a second cell, where the energy saving activation message is used to disable the energy saving function; transferring, by the first base station, the first cell from the energy saving state to the normal state according to the energy saving activation message, or keeping a third cell in the normal state until learning that the cell outage of the second cell is solved. This method prevents a coverage blind area in the network when a cell outage happens to a second cell that covers the area of a first cell which is in the energy saving state.

18 Claims, 5 Drawing Sheets

(51) Int. Cl.
*H04W 24/04* (2009.01)
*H04L 1/00* (2006.01)
*H04W 4/00* (2009.01)
*H04W 88/08* (2009.01)
*H04W 92/20* (2009.01)

(56) References Cited

FOREIGN PATENT DOCUMENTS

| | | | |
|---|---|---|---|
| CN | 101080047 | | 11/2007 |
| CN | 101232713 | | 7/2008 |
| CN | 101562851 | | 10/2009 |
| CN | 101594635 | | 12/2009 |
| EP | 2139278 A1 | | 12/2009 |
| JP | 2006-101442 A | | 4/2006 |
| WO | 2004/056143 | | 7/2004 |
| WO | 2009/078764 | | 6/2009 |
| WO | WO 2009/078764 | * | 6/2009 |
| WO | 2009/155480 | | 12/2009 |

OTHER PUBLICATIONS

"3rd Generation Partnership Project; Technical Specification Group Services and Systems Aspects; Telecommunication management; Evolved Universal Terrestrial Radio Access Network (E-UTRAN) Network Resource Model (NRM) Integration Reference Point (IRP): Information Service (IS) (Release 9)", 3GPP TS 32.762 V9.3.1, Apr. 2010, 24 pages.
International Search Report issued Aug. 11, 2012 in corresponding International Patent Application No. PCT/CN2011/073380.
Written Opinion of the International Searching Authority issued Aug. 11, 2012 in corresponding International Patent Application No. PCT/CN2011/073380.
Extended European Search Report dated May 21, 2013 in corresponding European Application No. 11774392.2.
International Search Report of Corresponding PCT Application PCT/CN2011/073380 mailed Aug. 11, 2011.
Chinese Search Report mailed Mar. 18, 2013 for corresponding Chinese Application No. 2010101694539.
Japanese Office Action issued Dec. 3, 2013, in corresponding Japanese Patent Application No. 2013-506474.
Chinese Search Report issued on May 5, 2014 in corresponding Chinese Patent Application No. 201310307470.8.
Chinese Office Action issued on Jun. 13, 2014 in corresponding Chinese Patent Application No. 201310307470.8.
Japanese Office Action mailed Jan. 20, 2015 in corresponding Japanese Patent Application No. 2014-101260.
Huawei, HiSilicon, "OAM Policy for inter-eNB Energy Saving", 3GPP TSG RAN WG3 Meeting #69, Madrid, Spain, Aug. 2010, 3 pp.
"3rd Generation Partnership Project; Technical Specification Group Services and System Aspects; Telecommunications Management; Self-Healing OAM; Concepts and Requirements (Release 10)", 3GPP TS 32.541, V1.2.0, Mar. 2010, pp. 1-21.

* cited by examiner

METHOD AND DEVICE FOR HANDLING CELL OUTAGE

CROSS-REFERENCE TO RELATED APPLICATIONS

This application is a continuation of International Application No. PCT/CN2011/073380, filed on Apr. 27, 2011, which claims priority to Chinese Patent Application No. 201010169453.9, filed on Apr. 30, 2010, both of which are hereby incorporated by reference in their entireties.

FIELD OF THE INVENTION

The present invention relates to the field of mobile communications, and in particular, to a method and device for handling a cell outage.

BACKGROUND

A base station on a self-organizing network may have an automatic energy saving function, and categorize cells into cells in the energy saving state and cells in the non-energy saving state. Specifically, the base station transfers some or all cells belonging to the base station from the normal state to the energy saving state by disabling some or all functions of the base station or reducing the transmit power of the base station according to a preset automatic energy saving policy, for example, according to such factors as current and expected network service use details. In this way, the quality of service of users is not reduced, and the power consumption of the base station is reduced.

A cell outage (Outage) is a network error scenario. On the self-organizing network, the automatic processing function for cell outages can quickly detect a cell outage in the case of a cell outage, and process the cell outage automatically.

In the prior art, the automatic energy saving function of the base station and the automatic processing function for cell outages may conflict on the self-organizing network.

SUMMARY

Embodiments of the present invention provide a method and device for handling a cell outage.

A method provided in an embodiment of the present invention includes: receiving, by a first base station, the energy saving activation message that a second base station sends when a cell outage happens to a second cell, where the energy saving activation message is used to disable the energy saving function and the second cell belongs to the second base station; transferring, by the first base station, a first cell from an energy saving state to a normal state according to the energy saving activation message, where the first cell belongs to the first base station and the second cell is a the second cell is a cell that takes over coverage of the first cell; or, keeping, by the first base station, a third cell in the normal state according to the energy saving activation message until learning that the cell outage of the second cell is already solved, where the third cell belongs to the first base station and the second cell is a cell that takes over coverage of the third cell.

A method provided in an embodiment of the present invention includes: receiving, by a first base station, a notification message used to indicate that a cell outage happens to a second cell from a second base station, where the second cell belongs to the second base station; transferring, by the first base station, a first cell from an energy saving state to a normal state according to the notification message, where the first cell belongs to the first base station and the second cell is a cell that takes over coverage of the first cell; or, keeping, by the first base station, a third cell in the normal state according to the notification message until learning that the cell outage of the second cell is already solved, where the third cell belongs to the first base station and the second cell is a cell that takes over coverage of the third cell.

A method provided in an embodiment of the present invention includes: when detecting that a cell outage happens to a second cell, enabling, by an integrated reference point manager, over an OAM northbound interface, a first base station to transfer a first cell from an energy saving state to a normal state, where the first cell belongs to the first base station and the second cell is a cell that takes over coverage of the first cell; or, when detecting that a cell outage happens to a second cell, keeping, by the integrated reference point manager, a third cell in the normal state over an OAM northbound interface until learning that the cell outage of the second cell is already solved, where the third cell belongs to the first base station and the second cell is a cell that takes over coverage of the third cell.

An base station provided in an embodiment of the present invention includes: a sending module, configured to receive a notification indicating that a cell outage happens to a second cell; and a handling module, configured to transfer a first cell from an energy saving state to a normal state, where the first cell belongs to the base station and the second cell is a cell that takes over coverage of the first cell; or the handling module is configured to keep a third cell in the normal state until the cell outage of the second cell is already solved, where the third cell belongs to the base station and the second cell is a cell that takes over coverage of the third cell.

A device provided in an embodiment of the present invention includes: a receiving module, configured to determine that a cell outage happens to a second cell; and a handling module, configured to instruct, over an OAM northbound interface, a first base station to transfer a first cell from an energy saving state to a normal state, where the first cell belongs to the base station and the second cell is a cell that takes over coverage of the first cell; or the handling module is configured to instruct, over an OAM northbound interface, a first base station to keep a third cell in the normal state until learning that the cell outage of the second cell is already solved, where the third cell belongs to the first base station and the second cell is a cell that takes over coverage of the third cell.

By using the method or device provided in embodiments of the present invention, a coverage blind area can be prevented when a cell outage happens to a second cell that covers the area originally covered by a first cell which is in the energy saving state.

DETAILED DESCRIPTION OF THE EMBODIMENTS

The following describes the technical solutions of the embodiments of the present invention clearly and completely with reference to the accompanying drawings in the embodiments of the present invention. It is evident that the described embodiments are only some embodiments of the present invention, rather than all embodiments of the present invention. Based on the embodiments of the present invention, all other embodiments obtained by persons of ordinary skill in the art without making any creative effort shall fall within the protection scope of the present invention.

Figure 1:
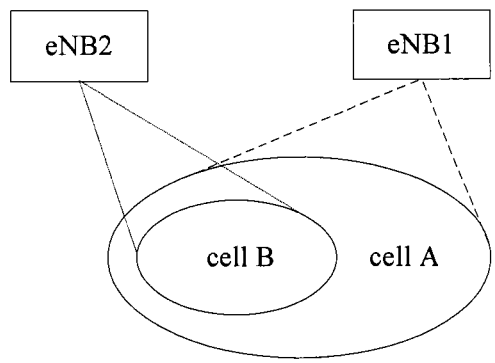
FIG. 1(a) is a schematic diagram of a distributed architecture according to an embodiment of the present invention.
FIG. 1(b) is a schematic diagram of a centralized architecture according to another embodiment of the present invention.
Figure 1:
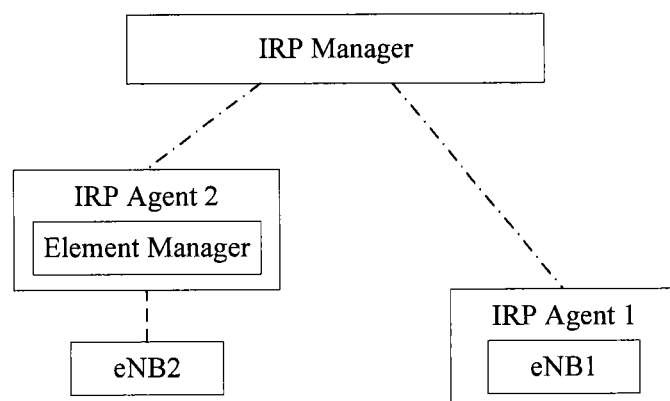

As shown in FIG. 1(*a*), when a self-organizing network in an embodiment of the present invention adopts a distributed architecture, a cell A (cell A) belongs to a base station 1 (eNB1), a cell B (cell B) belongs to a base station 2 (eNB2), and an X2 interface exists between the eNB1 and the eNB2. When the cell A is in the energy saving state, the cell B takes over the network coverage of the cell A, that is, the cell B is a cell that is capable of providing the coverage, compensating for the cell A. The cell B may be briefly called a compensating cell of the cell A. That is, when the eNB1 of the cell A enables the automatic energy saving function, the eNB1 enables, according to the setting of the energy saving function policy, the cell A to stay in the energy saving state (namely, go into the energy saving sate) at a certain time, and the cell B may take over the network coverage of the cell A.

As shown in FIG. 1(*b*), when a self-organizing network in an embodiment of the present invention adopts a centralized architecture, a cell A (cell A) belongs to a base station 1 (eNB1), a cell B (cell B) belongs to a base station 2 (eNB2), and the eNB1 and the eNB2 are managed by the same integrated reference point manager (IRP Manager). In other embodiments of the present invention, an OAM system may refer to the IRP Manager or a set of multiple devices including the IRP Manager. The eNB1 is located inside an integrated reference point agent (an IRP Agent1), and can communicate over an OAM northbound interface (itf-N) between the IRP Agent and the OAM system. The eNB2 and an IRP Agent2 are two independent devices, and the eNB2 communicates with a network element manager (Network Element Manager) in the IRP Agent 2, so that the eNB2 communicates with the OAM system over the itf-N interface between the IRP Agent 2 and the OAM system. In addition, whether the eNB and the IRP Agent are independent devices in the embodiments of the present invention does not affect the implementation of the embodiments. The communication between the eNB and the OAM system by using the IRP Agent will not be detailed in embodiments of the present invention. However, the communication between the eNB located inside the IRP Agent and the IRP Manager and the communication between the IRP and the IRP Manager by using an external device IRP Agent are uniformly called communication between the eNB and the OAM system over the itf-N interface.

An embodiment of the present invention provides a method for handling a cell outage under a distributed architecture. Taking FIG. 1(*a*) as an example, it is assumed that when the cell A is in the energy saving state, the cell B takes over the network coverage of the cell A. When a cell outage happens to the cell B, the cell A is transferred from the energy saving state to the normal state, so that the cell A takes back the original coverage, which reduces the impact of the cell outage that happens to a compensating cell on the network coverage.

Further, before the problem of the cell outage of the cell B is solved, the cell A does not go into the energy saving state again according to a preset automatic energy saving policy. In addition, when the cell A is in the normal state and a cell outage happens to the cell B, the cell A does not go into the energy saving state according to the original energy saving policy before the problem of the cell outage of the cell B is solved (that is, the cell outage ends). Therefore, a coverage blind area in the network can be prevented, or a ping-pong effect due to the frequent change of takeovers in the cell network coverage can be prevented.

Figure 2:
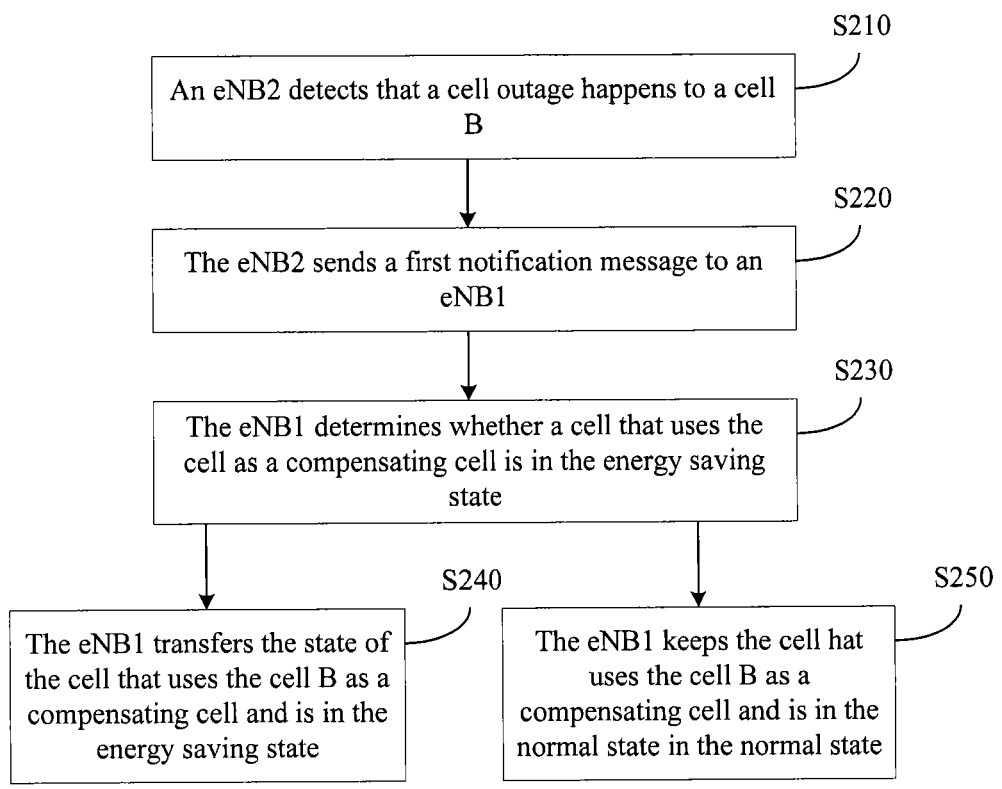
FIG. 2 is a flowchart of a method for handling a cell outage according to another embodiment of the present invention.

Taking the distributed architecture shown in FIG. 1(*a*) as an example, another embodiment of the present invention provides a method for handling a cell outage. As shown in FIG. 2, the method includes the following steps.

S210. An eNB2 detects that a cell outage happens to a cell B.

S220. The eNB2 sends a first notification message to an eNB1.

For example, the eNB2 sends a first notification message to all neighbor eNBs. Because the eNB1 is one of the neighbor eNBs of the eNB2, the eNB1 may receive the first notification message.

In another example, the eNB2 may obtain related information of the cell B to determine which cells may use the cell B as a compensating cell, and then the eNB2 sends the first notification message to the determined cell or cells.

The first notification message may include a cell identifier and cell outage indication information, where the cell outage indication information is used to indicate whether a cell outage happens to a cell corresponding to the cell identifier in the first notification message. For example, if the cell identifier in the first notification message is the cell identifier of the cell B, the cell outage indication indicates that a cell outage happens to the cell B.

Optionally, the eNB2 may further carry start delay time information in the first notification message or other messages. For example, the start delay time information includes waiting duration information, where the waiting duration information indicates a waiting duration from the time when the eNB1 receives the start time information to the time when a state transfer process of the cell A is started. Assuming the duration corresponding to the waiting duration information is T, the eNB1 waits for T after receiving the start delay time information. If failing to learn that the cell outage of the cell B is solved, the eNB1 starts the state transfer state of the cell A to transfer the cell A from the energy saving state to the normal state. In another example, the start delay time information includes start time information, where the start time information indicates the time when the eNB1 starts the state transfer process of the cell A. Assuming the start time information corresponds to time t. If the eNB1 does not learn that the cell outage of the cell B is solved at the time t, the eNB1 starts the state transfer process of the cell A to transfer the cell A from the energy saving state to the normal state. The above processing manner is applicable to a scenario in which the cell A does not have high network coverage requirements, for example, the cell A is a non-critical cell. After a cell outage happens to the cell B, the cell B may try to restore by itself. If the problem of the cell outage is solved within a period of time, the eNB1 does not need to change the state of the cell A and there is no major impact on the network coverage of the cell A. If the problem of the cell outage is not solved within a period of time, the eNB1 transfers the cell A from the energy saving state to the normal state, and the cell A takes over the former coverage.

S230. The eNB1 receives the first notification message, and determines whether a cell that uses the cell B as a compensating cell is in the energy saving state. If the cell in the energy saving state exists, perform S240. If the cell that is not in the energy saving state exists, perform S250.

For example, the eNB2 may send the first notification message to all neighbor eNBs, and the eNB1 may learn that a cell outage happens to the cell B according to the first notification message, and then obtain related information of each cell belonging to the eNB1 to determine whether there is a cell that can use the cell B as a compensating cell. For example, the eNB1 obtains related information of the cell A to determine whether the cell B is the compensating cell of the cell A and whether the cell is in the energy saving state.

S240. The eNB1 transfers the state of the cell that uses the cell B as a compensating cell and is in the energy saving state. After the transfer, the cell is in the normal state.

For example, if the cell A is in the energy saving state and the cell B takes over the network coverage of the cell A, the eNB1 transfers the cell A from the energy saving state to the normal state, so that a coverage blind area in the network is prevented when a cell outage happens to a cell that takes over the network coverage of the cell A which is in the energy saving state.

Optionally, if the eNB1 receives the start delay time information sent by the eNB2, for example, the first notification message received by the eNB1 in S230 includes the start delay time information, the eNB1 starts the state transfer process of the cell B after waiting for the start delay time to transfer the cell A from the energy saving state to the normal state. If the eNB1 learns that the problem of the cell outage of the cell B is solved when waiting for the arrival of the start delay time, the eNB1 does not need to transfer the state of the cell A due to the cell outage of the cell B.

In S230, if the eNB1 determines that there are multiple cells that are in the energy saving state and whose network coverage is taken over by the cell B, the eNB1 transfers all or some of these cells from the energy saving state to the normal state.

Further, before the eNB1 does not learn that the cell outage of the cell B ends, the eNB1 does not enable the cell A to go into the energy saving state again according to a preset automatic energy saving policy, that is, the eNB1 keeps the cell A in the normal state that is not energy saving, until determining that the cell outage of the cell B ends, therefore preventing a coverage blind area in the network.

S250. Before the cell outage of the cell ends, the eNB1 keeps the cell in the normal state that uses the cell B as a compensating cell and is in the normal state.

In this step, it is assumed that the cell B is the compensating cell of a cell C, that is, the cell B can take over the network coverage of the cell C. When a cell outage happens to the cell B and the cell C is not in the energy saving state, the eNB1 stores the cell outage indication and cell identifier that are received and does not enable the cell C to go into the energy saving state according to the preset automatic energy saving policy before the cell outage of the cell B ends. That is, the eNB1 may keep the cell C in the normal state until determining that the cell outage of the cell B ends. In the above processing manner, the eNB1 regards that the cell outage indication enjoys a higher priority than the preset automatic energy. For example, when there is the cell identifier of the cell B and a corresponding cell outage indication, the eNB1 does not consider the automatic energy saving policy, but keeps the cell C in the normal state. When learning that the cell outage of the cell B ends, the eNB1 clears the stored cell outage indication, and considers whether to transfer the cell A to the energy saving state according to the preset automatic energy saving policy. The above processing manner prevents a coverage blind area in the network due to the cell C that goes into the energy saving state when a cell outage happens to the cell B that takes over the network coverage of the cell C or prevents the ping-pong effect due to the frequent change of takeovers between the cell C and the cell B in the network coverage of the cell C.

Figure 3:
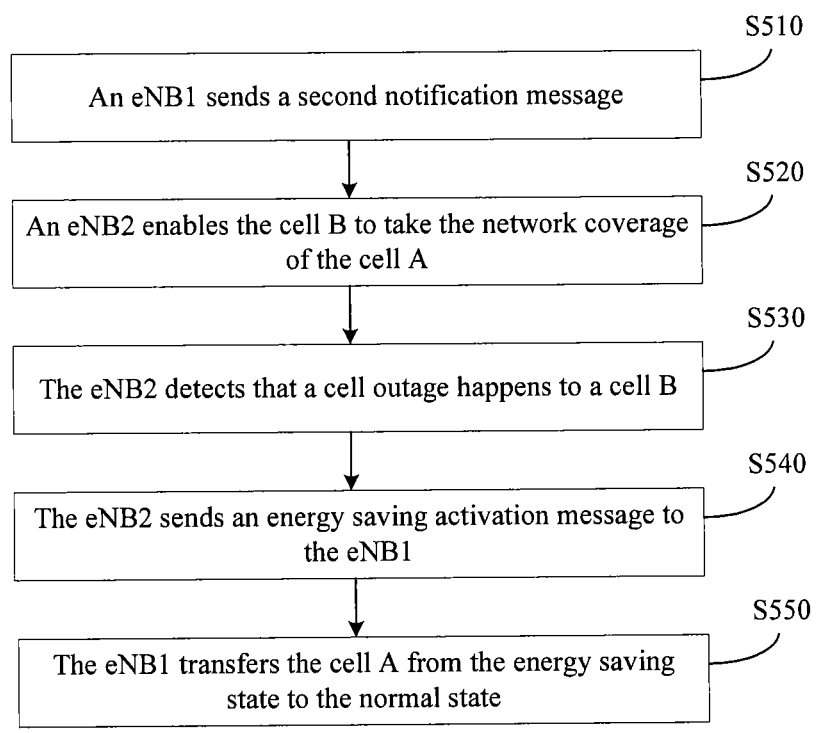
FIG. 3 is a flowchart of a method for handling a cell outage according to another embodiment of the present invention.

Taking the distributed architecture shown in FIG. 1(a) as an example, another embodiment of the present invention provides a method for handling cell outage. As shown in FIG. 3, the method includes the following steps.

S510. When a cell A goes into or is about to go into the energy saving state, an eNB1 to which the cell A belongs sends a second notification message to an eNB2 to which a neighbor cell B of the cell A belongs.

For example, if the eNB1 sends the second notification message to the eNBs to which all neighbor cells of the cell A belong, the eNB2 can receive the second notification message.

In another example, the eNB1 may obtain related information of the cell A to determine which cell or cells can be used as a compensating cell of the cell A, and then the eNB2 sends the second notification message to the determined cell or cells.

The second notification message may include a cell identifier and cell energy saving indication information, where the cell energy saving indication information is used to indicate whether cell energy saving happens to a cell corresponding to the cell identifier in the second notification message. For example, when the cell A goes into the energy saving state, the second notification message includes the cell identifier of the cell A, and the energy saving indication information of the cell indicates that the cell is transferred to the energy saving state.

In this step, when the cell A is about to go into the energy saving state, the eNB1 sends the second notification message, and the cell A goes into the energy saving state immediately or a period of time after the eNB1 sends the second notification message. In the process of waiting for a period of time, the eNB1 may complete processing related to that case that the cell A goes into energy saving.

S520. The eNB2 to which the cell B belongs receives the second notification message, and enables the cell B to take over the network coverage of the cell A.

Because the eNB1 may send the second notification message to the eNBs of all neighbor cells of the cell A, in this step, the eNB2 may determine whether the cell belonging to the eNB2 includes a cell that can be used as a compensating cell of the cell A.

S530. The eNB2 detects that a cell outage happens to a cell B.

S540. The eNB2 sends an energy saving activation message to the eNB1 to which the cell A that can use the cell B as a compensating cell belongs, where the energy saving activation message is used to instruct the eNB1 to transfer the cell A to the normal state.

For example, if the eNB2 has stored the information indicating that the cell A is in the energy saving state before detecting that a cell outage happens to the cell B, the eNB2 determines that a cell that needs to be activated is the cell A.

In another example, the eNB2 may obtain related information of the cell B to determine which cell or cells can use the cell B as a compensating cell, and then send an energy saving activation message to the determined cell or cells or the eNB2 sends an energy saving activation message to the cell or cells in the energy saving state.

Optionally, the energy saving activation message is a cell activation request (CELL ACTIVATION REQUEST) message that includes cell identifiers of served cells to activate (Served Cells To Activate) and information of reason for activation (Reason For Activation). For example, when the eNB2 determines, according to the related information of the cell B, that the cell A needs to be activated due to the cell outage of the cell B, the Served Cells To Activate information is the cell identifier of the cell A, and the Reason For Activation information is a cause value of a cell outage (CO), that is, the cause value indicates that the cell is activated due to the happening of a cell outage. Optionally, the Reason For Activation may be an enumerated type, for example, the information further includes a load balance (LB) cause value besides the cause value of the cell outage, where the LB is used to indicate that an energy-saving cell is activated due to the load balance. That is, when determining to activate a cell due to the load balance, the eNB2 may send an energy saving activation message to an eNB to which the cell belongs, where the energy saving activation message includes the cell identifier of the cell and the load balance cause value.

Optionally, the eNB2 may also carry start delay time information in the energy saving activation message, where the start delay time information is used to indicate a waiting duration from the time when the eNB1 receives the start delay time information to the time when the eNB1 starts a state transfer process of the cell A.

S550. The eNB1 receives an energy saving activation message, and transfers the cell A from the energy saving state to the normal state.

For example, the eNB1 determines, according to the information of reason for activation in the energy saving activation message, whether cells corresponding to the cell identifiers of the served cells to activate are in the energy saving state; if yes, the eNB1 transfers the state of the cell A to the normal state. In this way, a coverage blind area in the network is prevented when the cell A is in the energy saving state and a cell outage happens to a cell that takes over the network coverage of the cell A.

If the energy saving activation message received by the eNB1 includes the start delay time information, the eNB1 starts the state transfer state of the cell B after waiting for the start delay time, so that the state of the cell A is transferred to the normal state. If the eNB1 learns that the problem of the cell outage is solved when waiting for the arrival of the start delay time, the eNB1 does not need to transfer the state of the cell A due to the cell outage of the cell B.

Further, before the eNB1 does not learn that the cell outage of the cell B ends, the eNB1 keeps the cell A in the normal state.

In the above embodiment, when a cell outage happens to the cell B, the eNB2 may notify other eNBs that a cell outage happens to the cell B, and the eNBs that receive the notification determine specific processing manners for specific cells. The eNB2 may also determine specific processing manners for specific cells, and then notify the eNBs to which the cells belong that the eNBs need to perform activation processing, for example, it notifies, by using an energy saving activation message, the eNB1 that the eNB1 needs to activate the cell A in the energy saving state, so that the state of the cell A is transferred to the normal state. When one of the eNB1 and the eNB2 determines which cells need to be processed for cell outages, a coordinated processing between the automatic energy saving function on a network and a scenario in which a cell outage happens can be implemented.

The base stations in each embodiment of the present invention may determine a coverage compensation relationship between cells by querying an internal database or other external devices with the database function. The external devices with the database function include an OAM system (IRP Manager). A base station may send a query message that includes cell identifiers of cells to be queried to the OAM system over the itf-N interface, and then receive query results provided by the OAM system to determine a coverage compensation relationship between cells. The OAM system can determine the coverage compensation relationship between cells according to internal data rather than interface messages. In this case, the OAM system manages base stations more conveniently and quickly, ensures that the information obtained by different base stations are the same, and supports operators in configuring and updating the coverage compensation relationship between cells in the OAM system. If the internal database of a base station stores the coverage compensation relationship between cells, the base station can determine the coverage compensation relationship between cells directly rather than by using an interface message. In this way, fewer air interface resources are occupied, and an operator can directly configure or update the coverage compensation relationship between cells in the base station.

For example, another embodiment of the present invention provides a method for learning, by the base station, a coverage compensation relationship between cells. In this embodiment, the coverage compensation relationship between cells means that a cell to be queried may be used as a compensating cell of other cell(s). The following is based on the case that a cell to be queried is the cell B.

Optionally, the base station in this embodiment receives neighbor cell relation information related to the energy saving of the cell B, that is, neighbor cell relation information ESCompensatedCellRelation of the cell B, where the ESCompensatedCellRelation information includes cell information (esCompensatedCell) of a cell whose compensating cell may be the cell B. For example, if the esCompensatedCell information is the cell identifier information of the cell A, the base station determines that the cell B may be used as a compensating cell of the cell A. If the ESCompensatedCellRelation information that is found by the base station includes cell identifier information of multiple cells, the base station determines that the cell B may be used as a compensating cell of the multiple cells.

Optionally, the base station in this embodiment receives neighbor cell relation information related to the cell B, that is, neighbor cell relation information EUtranRelation of the cell B. The EUtranRelation information may include neighbor cell information (adjacentCell) of the cell B, where the adjacentCell information indicates that there is a neighbor relation between a cell corresponding to the adjacentCell information and the cell B and is also used to indicate that the cell B is the compensating cell of a cell corresponding to the adjacentcell information. For example, if the adjacentcell information includes the cell identifier of the cell A, the base station determines that the cell B may be used as a compensating cell of the cell A. If the adjacentcell information that is found by the base station includes cell identifier information of multiple cells, the base station determines that the cell B may be used as a compensating cell of the multiple cells.

Optionally, the base station in this embodiment receives cell attribute information related to the cell B, that is, cell attribute information EUtranGenericCell information of the cell B, where the EUtranGenericCell information includes compensating cell list information (compensatedCellList). The compensatedCellList information indicates which cells may use the cell B as a compensating cell. For example, if the compensatedCellList information includes the cell information of the cell A (for example, cell identifier information), the base station determines that the cell B may be used as a compensating cell of the cell A. If the compensatedCellList information related to the cell B that is found by the base station includes cell information of multiple cells (for example, cell identifier information), the base station determines that the cell B can be used as a compensating cell of the multiple cells.

Another embodiment of the present invention provides a method for learning, by the base station, a coverage compensation relationship between cells. This embodiment is different from the above embodiment of learning, by the base station, a coverage compensation relationship between cells in that: the coverage compensation relationship between cells in this embodiment means that other cell(s) may be used as a compensating cell of a cell to be queried. The following is based on the fact that a cell to be queried is the cell A.

Optionally, the base station in this embodiment receives neighbor cell relation related to the energy saving of the cell A, that is, neighbor cell relation information ESCompensatingCellRelation of the cell A, where the ESCompensatingCellRelation information includes cell information (esCompensatedCell) of a cell that may be used as a compensating cell of the cell A. For example, if the esCompensatingCell information is the cell identifier information of the cell B, the base station determines that the cell B may be used as a compensating cell of the cell A. If the ESCompensatingCellRelation information that is found by the base station includes cell identifier information of multiple cells, the base station determines that the multiple cells may be used as a compensating cell of the cell A.

Optionally, the base station in this embodiment receives neighbor cell relation information related to the cell A, that is, neighbor cell relation information EUtranRelation information of the cell A, where the EUtranRelation information includes neighbor cell information of the cell A (adjacentCell) and indicates that there is a neighbor relation between a cell corresponding to the adjacentcell information and the cell A and is further used to indicate that a cell corresponding to the adjacentcell information may be used as a compensating cell of the cell A. For example, if the adjacentcell information includes the cell identifier of the cell B, the base station determines that the cell A may be used as a compensating cell of the cell B. If the adjacentcell information of the cell A that is found by the base station includes cell identifier information of multiple cells, the eNB determines that the multiple cells may be used as a compensating cell of the cell A.

Optionally, the base station in this embodiment receives cell attribute information related to the cell A, that is, cell attribute information EUtranGenericCell of the cell A, where the EUtranGenericCell information includes compensating cell list information (compensatingCellList). The compensatingCellList information indicates which cells may be used as a compensating cell of the cell A. For example, if the compensatingCellList information includes the cell information of the cell B (for example, cell identifier information), the base station determines that the cell B may be used as a compensating cell of the cell A. If the compensatingCellList information that is found by the base station includes cell information (for example, cell identifier information) of multiple cells, the eNB determines that the multiple cells may be used as a compensating cell of the cell A.

In the above embodiment of the method for learning, by the base station, the coverage compensation relationship between cells, the base station that queries the coverage compensation relationship can query information of a cell belonging to the base station according to the identifier of the cell belonging to the eNB and can also query information of another cell according to the information of the another cell, and determine whether there is an coverage compensation relationship between the two cells. The method provided in the above embodiment can be flexibly combined into the method for handling cell outage provided in other embodiments of the present invention.

Another embodiment of the present invention provides a method for determining whether a cell is allowed to go into the energy saving state. This method is hereinafter described in detail.

Optionally, in this embodiment, an eNB 1 receives neighbor cell relation information (EUtranRelation) related to a cell A, where the EUtranRelation information includes energy saving compensation cell information (isEScompensateCell) of the cell A and is used to indicate whether energy saving is allowed for the cell A. For example, if the isEScompensateCell information received by the eNB1 indicates that energy saving is allowed for the cell A, the eNB1 may determine, according to a preset automatic energy saving policy, whether a condition for allowing the cell A to go into the energy saving state is met; if yes, the eNB1 may transfer the cell A from the normal state to the energy saving state, so that the cell A goes into the energy saving state.

Optionally, in this embodiment, an eNB1 receives cell attribute information (EUtranGenericCell) related to the cell A, where the EUtranGenericCell information includes identifier information of allowed energy saving (isESAllowed) of the cell A and is used to indicate whether energy saving is allowed for the cell A. For example, if the isESAllowed information received by the eNB1 indicates that energy saving is allowed for the cell A, the eNB1 may determine, according to a preset automatic energy saving policy, whether a condition for allowing the cell A to go into the energy saving state is met; if yes, the eNB1 may transfer the cell A from the normal state to the energy saving state, so that the cell A goes into the energy saving state.

In this embodiment, the information indicating that energy saving is allowed for a cell received by the base station may be sent by an OAM system, that is, whether the information indicating that energy saving is allowed for a cell is received may be considered a configuration related to the energy saving formulated by the OAM system. That is, in the initial configuration or updated configuration formulated by the OAM system, not all cells are configured to be cells for which energy saving is allowed. Therefore, the OAM system differentiates the cells for which energy saving is allowed from the cells for which energy saving is not allowed, and then sends information indicating whether energy saving is allowed for a cell to the base station according to the differentiation result. In this way, the OAM system manages base stations conveniently and quickly, and the base stations can learn which cells are allowed to go into the energy saving state when determining that the automatic energy saving policy is met and make them go to the energy saving state, thus reducing the power consumption of the base stations.

In addition, by using a method for learning, by a base station, a coverage compensation relationship between cells provided in other embodiments of the present invention, the base station can determine the compensating cell of a cell for which energy saving is allowed, and can also determine which cell or cells may use a cell for which energy saving is not allowed as a compensating cell.

This embodiment may be combined with the method for handling a cell outage provided in other embodiments of the present invention. For example, after determining that a cell for which energy saving is allowed and transferring the cell to the energy saving state, a base station may further perform a step after the cell goes into the energy saving state in other embodiments of the present invention, for example, step S510.

Another embodiment of the present invention provides a method for learning, by a base station, whether the cell outage of a cell ends. In the method, the base station initiates a query to the base station of the cell where a cell outage happens and determines whether the cell outage of the cell ends according to a received feedback message, where the query can be implemented by sending a query message periodically, or by sending a query message at a preset time, or by carrying a query field in a message in a current communication process.

This embodiment may be flexibly combined with the method for handling a cell outage provided in other embodiments of the present invention. Taking how the eNB1 learns that the cell outage of a cell B belonging to the eNB2 ends as an example, the eNB1 can send a query message to the eNB2 periodically, where the query message is used to query whether the cell outage of the cell B ends. When detecting that no cell outage happens to the cell B, that is, the cell B already recovers, the eNB2 sends a feedback message, where the feedback message is used to indicate that the cell outage of the cell B ends. If detecting that cell B is still in the cell outage, the eNB2 may notify the eNB1 of the fact that the cell outage of the cell B does not end, rather than send a feedback message.

Another embodiment of the present invention also provides a method for learning, by a base station, whether a cell outage of a cell ends. In this method, the base station does not initiate a query proactively, but waits for a notification indicating that the cell outage ends that is sent by the base station to which the cell belongs. That is, when the base station does not receive the notification, the base station considers the cell where the cell outage happens as a cell where the problem of the cell outage is still not solved. This embodiment may be flexibly combined with the method for handling a cell outage provided in other embodiments of the present invention, and is not further described.

Figure 4:
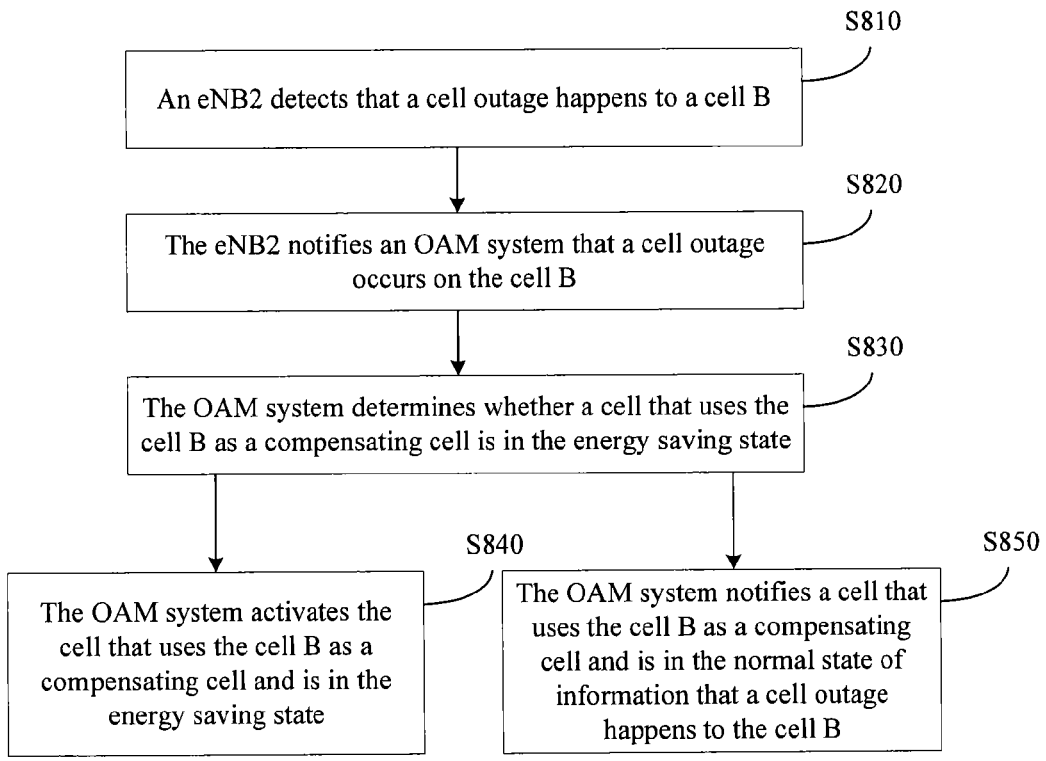
FIG. 4 is a flowchart of a method for handling a cell outage according to another embodiment of the present invention.
Figure 5:
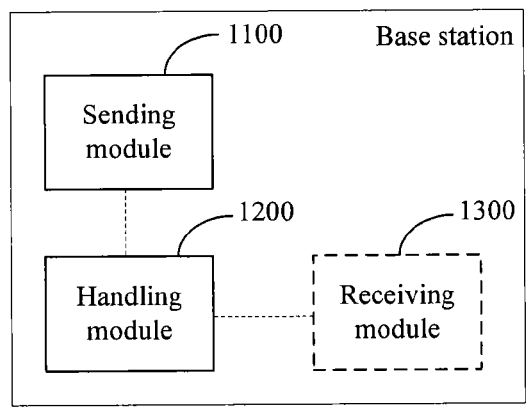
FIG. 5 is a schematic diagram of a base station according to another embodiment of the present invention.

Taking the centralized architecture provided in FIG. 1(b) as an example, another embodiment of the present invention also provides a method for handling a cell outage. By using this method, an OAM system manages base stations on a unified basis, and energy saving of base stations and cell outage handling may be coordinated. This embodiment describes an optional case that the OAM system learns that a cell outage happens to a second cell by receiving a notification from the eNB2. The OAM system provided in this embodiment may also determine that a cell outage happens to the second cell according to information stored in the OAM system, which is not further described. As shown in FIG. 4, the method provided in this embodiment may include the following steps.

S810. An eNB2 detects that a cell outage happens to a cell B.

S820. The eNB2 notifies an OAM system of the fact that a cell outage happens to the cell B.

For example, the eNB2 sends a third notification message to the OAM system. The third notification message includes the cell identifier of the cell B where the cell outage happens and cell outage indication information, where the cell outage indication information indicates that the cell outage happened.

S830. The OAM system receives the third notification message, and determines whether a cell that uses the cell B as a compensating cell is in the energy saving state. If that cell that is in the energy saving state exists, perform S840. If a cell that is not in the energy saving state does not exist, perform S850.

The OAM system may determine, according to a coverage compensation relationship between cells that is stored in the OAM system and state information of the cell, whether the cell that uses the cell B corresponding to the cell identifier in the third notification message as a compensating cell is in the energy saving state.

The OAM system in this step may determine that there are multiple cells that have coverage compensation relationships with the cell B and are in the energy saving state or there are multiple cells that have coverage compensation relationships with the cell B and are in the normal state. In this case, the OAM system may perform S840 or S850 for these cells at the same time or in turn.

S840. The OAM system activates the cell that uses the cell B as a compensating cell and is in the energy saving state.

For example, the cell B may take over the network coverage of the cell A; when a cell outage happens to the cell B, the cell A is in the energy saving state. When the OAM system determines that a cell outage happens to the cell B, the OAM system activates the cell A, which prevents a coverage blind area in the network when a cell outage happens to a cell that takes over the network coverage of the cell A which is in the energy saving state.

Optionally, the OAM system may send DisableES information (DisableES) to a base station by using an independent message to activate a corresponding cell and keep the cell in the normal state. For example, if a message has a meaning of disabling the energy saving function of a cell, the base station may determine, by receiving the message, that all cells belonging to the base station need to be processed by default. If the message further carries an object identifier for disabling the energy saving function, for example, a cell identifier or a base station identifier, the base station may determine how to process cells by receiving the message. The message may also have a meaning that the reason for transmission is a cell outage of other cell(s), so that the base station that receives the message learns the reason for disabling the energy saving. For example, the OAM system sends a message including the disable energy saving information DisableES to the eNB1 over an itf-N interface. If the disable energy saving information includes the cell identifier of the cell A for which energy saving is disabled, the eNB1 learns that the cell A needs to be transferred to the normal state, and keeps the cell A in the normal state at least until learning that the problem of the cell outage of the cell B is already solved. If the disable energy saving information includes a base station identifier, the eNB1 may learn that all cells belonging to the eNB1 need to be kept in the normal state until learning that the problem of the cell outage of the cell B is already solved. When the eNB1 receives a message including the disable energy saving information DisableES, if only some cells of all cells belonging to the eNB1 are in the energy saving state, the eNB1 transfers the states of the cells to the normal state, and keeps the cells belonging to the eNB1 in the normal state until learning that the problem of the cell outage of the cell B is already solved, thus preventing a coverage blind area in the network.

Optionally, the OAM system may carry the disable energy saving information in an activation message. For example, the OAM system sends an activation message to the eNB1 over the itf-N interface, where the activation message includes the disable energy saving information DisableES. Optionally, the disable energy saving information includes identifier information of a cell or a base station for which energy saving is disabled. In addition, the activation message further includes reason information for disabling energy saving function. If the OAM system sends the cell identifier of the cell A and a cause value of cell outage to the eNB1, the NB 1 learns that the cell A needs to be transferred to the normal state because a cell outage happens to other cell(s) and the cell A needs to be kept in the normal state at least until learning that the problem of the cell outages of other cell(s) is already solved, thus preventing a coverage blind area in the network. If the OAM system sends the identifier of the eNB1 of the cell A and the cause value of cell outage to the eNB1, the eNB1 learns that all cells belonging to the eNB1 at least need to be kept in the normal state until learning that the problem of the cell outages of other cell(s) is solved. When the eNB1 receives an activation message, if only some cells of all cells belonging to the eNB1 are in the energy saving state, the eNB1 transfers the states of the cells to the normal state, and keeps the cells belonging to the eNB1 in the normal state until learning that the problem of the cell outage of the cell B is already solved, thus preventing a coverage blind area in the network.

Optionally, the activation message further includes configuration parameter information, that is, the OAM system notifies the eNB1 of a configuration parameter related to the cell A, so that the eNB1 completes modification of the configuration parameter related to the cell A. In this way, cell A provides better coverage after being activated. If the activation message does not include the configuration parameter information, the cell A may use the former configuration parameter information or receive a configuration parameter modify command that includes a new configuration parameter of the cell A.

S850. The OAM system notifies the cell that uses the cell B as a compensating cell and is in the normal state that a cell outage happens to the cell B.

Assuming the cell B can serve as a compensating cell for the network coverage of a cell C, if the cell C is not in the energy saving state when a cell outage happens to the cell B, the OAM system notifies the eNB1 of the cell C that a cell outage happens to the cell B; before the cell outage of the cell B ends, the eNB1 does not allow the cell C to go into the energy saving state following a preset automatic energy saving policy. That is, the eNB1 may at least keep the cell C in the normal state until determining that the cell outage of the cell B ends, thus preventing a coverage blind area in the network or ping-pong effect due to the frequent change of takeovers between the cell C and the cell B under the network coverage of the cell C. The processing manner of the eNB1 is similar to the processing manner in S250 in other embodiments of the present invention, and is not further described.

In this step, the OAM system may adopt a processing manner of sending the disable energy saving information in the S840, for example, the DisableES information includes the cell identifier of the cell C, so that the eNB1 learns that the cell C at least needs to be kept in the normal state due to the cell outage of other cell(s) until learning that the problem of the cell outage of the cell B is solved. Details are not further given.

The method for learning, by a base station, whether the cell outage of a cell ends provided in other embodiments may also be combined in this embodiment, or the OAM system sends a query message to the eNB2 and receives a feedback message, or the OAM system receives a notification sent by the eNB2 and learns that the problem of the cell outage of the cell B is already solved. Then, the OAM system notifies the eNB1 that the cell outage of the cell B is solved, so that the eNB1 immediately learns that the cell outage ends and allows the cell A to go into the energy saving state.

Another embodiment of the present invention provides a method for enabling energy saving of a cell. This embodiment is applicable to various scenarios in which an OAM system enables energy saving of a cell in the normal state, and can be combined with the method for handling a cell outage under the centralized architecture provided in other embodiments of the present invention. For example, in S840 or S850, the eNB1 disables energy saving of a cell A, that is, enables the cell A to keep in the normal state. Next, if receiving enable energy saving information, the eNB1 may reuse the automatic energy saving policy to determine whether the cell A is allowed to go into the energy saving state, so that the cell A has an opportunity to go into the energy saving state again.

Optionally, the OAM system may send enable energy saving information (EnableES) to a base station by using an independent message to enable the energy saving function of a corresponding cell. For example, if a message has a meaning of enabling the energy saving function of a cell, the base station may determine, by receiving the message, that all cells belonging to the base station need to be processed by default. If the message further carries an object identifier for enabling the energy saving function, for example, a cell identifier or a base station identifier, the base station may determine how to process these cells by receiving the message. The message may also have an indication that the reason for transmission is a cell outage of another cell, so that the base station that receives the message learns the reason for enabling energy saving. For example, the OAM system sends a message that includes the enable energy saving information EnableES to the eNB1 over an itf-N interface. If the EnableES information includes a cell identifier of the cell A for which energy saving is allowed, the eNB1 learns that the cell A does not need to be kept in the normal state; if the automatic energy saving policy is met, the cell A is allowed to go into the energy saving state. If the enable energy saving information includes the identifier of the eNB1, the eNB1 may learn that all cells belonging to the eNB1 do not need to be kept in the normal state.

Optionally, the OAM system may carry the enable energy saving information in a deactivation message. For example, the OAM system sends a deactivation message to the eNB1 over the itf-N interface, where the deactivation message includes the EnableES information. The EnableES information includes the identifier of a cell or a base station for which energy saving is enabled. In addition, the deactivation message further includes reason information for enabling energy saving function. If the OAM system sends the cell identifier of the cell A and a cause value of the solved cell outage to the eNB1, the eNB1 learns that the cell A does not need to be kept in the normal state due to the cell outages of other cell(s). If the OAM system sends the identifier of the eNB1 of the cell A and a cause value of the solved cell outage to the eNB1, the eNB1 learns that all cells belonging to the eNB1 do not need to be kept in the normal state due to the cell outages of other cell(s).

In this embodiment, a base station of a cell which is in the normal state is allowed to recover the energy saving function of the cell immediately, so that the cell has an opportunity to go into the energy saving state as soon as possible, thus reducing the power consumption of the base station.

Another embodiment of the present invention provides a processing method related to a cell configuration parameter. This method may be combined with a method for handling a cell outage applicable to the centralized architecture provided in other embodiments of the present invention.

In this embodiment, the cell B may serve as a compensating cell for the network coverage of the cell A; when a cell outage happens to the cell B, the OAM system activates the cell A by sending an activation message to the eNB1 of the cell A. When the activation message does not include configuration parameter information, the eNB1 receives a configuration parameter modify command, where the configuration parameter modify command includes a configuration parameter related to the cell A and a reason for modifying the configuration parameter. The reason for modification may be a cause value indicating a cell outage, or be a cause value indicating that the modification is different from modifications caused by non-cell outages, for example, the reason for modifying a configuration parameter differentiates at least two identifiers; one identifier indicates that the configuration parameter is modified due to cell outages of other cell(s) (for example, the cell B), which is different from another identifier indicating that a configuration parameter is modified due to other reasons. The eNB1 also stores the modified configuration parameter, and the reasons for modifying the configuration parameter. In this way, when learning that the cell outage of a cell ends, the eNB1 may restore a configuration parameter related to the cell A that are modified due to the cell outage of the cell B to an original configuration parameter, thus achieving fast recovery of a cell related configuration parameter and reducing the impact on a cell (for example, the cell A) due to the cell outage of other cell(s) (for example, the cell B).

Figure 6:
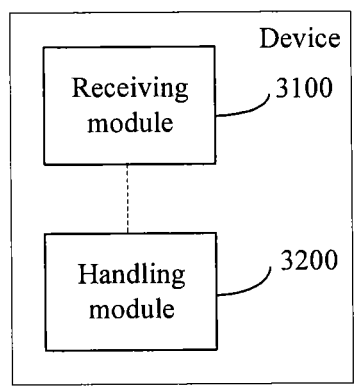
FIG. 6 is a schematic diagram of a device according to another embodiment of the present invention.

As shown in FIG. 6, another embodiment of the present invention provides a base station eNB1, where the base station includes a sending module 1100 and a handling module 1200. The sending module 1100 is configured to receive a notification indicating that a cell outage happens to a second cell, and the handling module 1200 is configured to: transfer a first cell from the energy saving state to the normal state, where the first cell belongs to the eNB1 and the second cell is a cell that takes over coverage of the first cell, and optionally keep the first cell in the normal state. Or the handling module 1200 is configured to keep a third cell in the normal state until the problem of the cell outage of the second cell is solved. The third cell belongs to the eNB1, and t the second cell is a cell that takes over coverage of the cell C.

Optionally, the sending module 1100 is configured to receive the cell identifier of the second cell and cell outage indication information indicating that a cell outage happens to the second cell. Optionally, the sending module 1100 is configured to receive an energy saving activation message, where the energy saving activation message includes the cell identifier of the second cell and a reason for activation, where the reason for activation includes a cause value of cell outage. For example, the second cell belongs to a second base station, and the energy saving activation message is sent by the second base station.

Optionally, the base station further includes a receiving module 1300 configured to receive start delay time information, where the start delay time information includes waiting duration information. The handling module 1200 is further configured to, after the receiving module 1300 receives the start delay time information, start a state transfer process of the first cell when the waiting duration arrives.

Optionally, the base station further includes a receiving module 1300 configured to receive start delay time information, where the start delay time information includes start time information. The handling module 1200 is further configured to start the state transfer process of the first cell when the start time that comes from receiving module 1300 arrives.

Optionally, the handling module 1200 is further configured to determine that the second cell is a cell that takes over coverage of the first cell.

Optionally, the receiving module 1300 is configured to: after the handling module 1200 determines that the second cell is a cell that takes over coverage of the first cell, receive a notification indicating that a cell outage happens to the second cell. Optionally, the handling module 1200 is configured to: after the receiving module 1300 receives a notification indicating that a cell outage happens to the second cell, determine that the second cell is a cell that takes over coverage of the first cell.

Optionally, the sending module 1100 is further configured to: before the receiving module 1300 receives a notification indicating that a cell outage happens to the second cell and after the handling module 1200 determines that the second cell is a cell that takes over coverage of the first cell, send the cell identifier of the first cell and cell energy saving indication information, where the cell energy saving information indication indicates that the first cell goes into the energy saving state.

Optionally, the handling module 1200 is configured to determine that the second cell is a cell that takes over coverage of the first cell according to the identifier of the second cell received by the receiving module 1100. For example, the receiving module 1100 receives neighbor cell relation information ESCompensatingCellRelation, or energy saving compensation cell information EUtranRelation information, or cell attribute information EUtranGenericCell, where the neighbor cell relation information, or the energy saving compensation cell information, or the cell attribute information carries identifier information of the second cell.

Optionally, the sending module 1100 is further configured to send the cell identifier of the first cell, for example, to an IRP Manager, before the receiving module 1100 receives the identifier of the second cell.

Optionally, the receiving module 1100 is further configured to receive a configuration parameter modify command that includes a configuration parameter of the first cell and a reason for modifying the configuration parameter, where the reason for modification is a cause value of a cell outage or a cause value indicating that the modification is different from the modifications caused by non-cell outages.

Optionally, the receiving module 1100 is further configured to receive a notification indicating that the cell outage of the second cell ends, and the handling module 1200 is further configured to keep the first cell in the normal state or transfer the first cell from the normal state to the energy saving state according to the automatic energy saving policy.

By using the base station provided in this embodiment, a coverage blind area in the network can be prevented when a cell outage happens to a second cell that takes over the network coverage of a first cell which is in the energy saving state.

As shown in FIG. 6, another embodiment of the present invention provides a device. The device includes a receiving module 3100 and a handling module 3200. The receiving module 3100 is configured to determine that a cell outage happens to a second cell, for example, by receiving the cell identifier of the second cell and cell outage indication information indicating that a cell outage happens to the second cell. The handling module 3200 is configured to: instruct, over an OAM northbound interface, a first base station to transfer a first cell from the energy saving state to the normal state, where the first cell belongs to the eNB1, and the second cell is a cell that takes over coverage of the first cell, and optionally, keep the first cell in the normal state. Or the handling module 3200 is configured to instruct, over an OAM northbound interface, a first base station to keep a third cell in the normal state until learning that the problem of the cell outage of the second cell is already solved, where the third cell belongs to the first base station, and the second cell is a cell that takes over coverage of the third cell. Optionally, the cell outage indication information is sent by a second base station of the second cell.

Optionally, the handling module 3200 is configured to send, over the OAM northbound interface, reason information for disabling energy saving function to the first base station, where the reason information for disabling energy saving function is a cause value of the cell outage. The handling module 3200 is further configured to send an identifier of an object for which energy saving is disabled over the OAM northbound interface, for example, where the identifier of an object for which energy saving is disabled is the cell identifier of the first cell or the identifier of the first base station.

Optionally, the handling module 3200 is configured to receive an activation message, where the activation message includes reason for disabling energy saving function or an identifier for disabling energy saving function, where the activation message further includes configuration parameter information of the first cell.

Optionally, the handling module 3200 is further configured to send a configuration parameter modify command to the first base station, where the configuration parameter modify command includes a configuration parameter of the first cell and a reason for modifying the configuration parameter, where the reason for modification is a cause value of the cell outage or a cause value indicating that the modification is different from modifications caused by non-cell outages.

Optionally, the handling module 3200 is further configured to: before the receiving module 3100 receives the cell identifier of the second cell and cell outage indication information indicating that a cell outage happens to the second cell, send indication information related to the first cell to the first base station, where the indication information is used to indicate that the energy saving is allowed for the first. For example, the indication information is energy saving compensation cell information isEScompensateCell in neighbor cell relation information EUtranRelation information, or energy saving allowed information isESAllowed in cell attribute information EUtranGenericCell of the first cell.

Optionally, the receiving module 3100 is further configured to receive a notification indicating that the cell outage of the cell B ends, and the handling module 3200 is further configured to send reason information for enabling energy saving function to the first base station over the OAM northbound interface, for example, where the reason information for enabling energy saving function is the cause value of the solved cell outage.

Optionally, the handling module 3200 is further configured to send an identifier of an object for which energy saving is allowed over the OAM northbound interface, for example, where the identifier of an object for which energy saving is allowed is the cell identifier of the first cell or the identifier of the first base station.

The device provided in this embodiment may be an IRP Manager. By using the base station provided in this embodiment, a coverage blind area in the network can be prevented when a cell outage happens to a second cell that covers the area of a first cell which is in the energy saving state.

More optional methods applying the device provided in this embodiment can be referred to the methods provided in other embodiments, and are not further described.

A person skilled in the art may understand that all or part of the steps in the preceding embodiments may be completed by a program instructing relevant hardware. The program may be stored in a computer readable storage medium such as a ROM/RAM, a magnetic disk or a compact disk.

It should be noted that the above descriptions are merely exemplary embodiments of the present invention, and a person skilled in the art may make various improvements and refinements without departing from the principles of the invention. All such modifications and refinements are intended to be covered by the present invention.

What is claimed is:

1. A method for handling a cell outage, comprising:
   when determining, by an integrated reference point (IRP) manager, that a cell outage happens to a second cell that takes over coverage of a first cell; and
   instructing, by the IRP manager, over an operation, administration and maintenance (OAM) northbound interface, a first base station to transfer the first cell from an energy saving state to a normal state, wherein the first cell belongs to the first base station.

2. The method according to claim 1, wherein the determining, by the IRP manager, that the cell outage happens to the second cell, comprises:
   receiving, by the IRP manager, a cell identifier of the second cell and cell outage indication information indicating that the cell outage happens to the second cell that are sent by a second base station, wherein the second cell belongs to the second base station.

3. The method according to claim 1, wherein the instructing, by the IRP manager, over the OAM northbound interface, the first base station to transfer the first cell from the energy saving state to the normal state, comprises:
   sending, by the IRP manager, over the OAM northbound interface, reason information for disabling an energy saving function to the first base station, wherein the reason information for disabling the energy saving function is a cause value of the cell outage.

4. The method according to claim 3, further comprising:
   sending, by the IRP manager, over the OAM northbound interface, an identifier of an object for which energy saving is disabled or configuration parameter information to the first base station, wherein the identifier of the object for which energy saving is disabled is a cell identifier of the first cell or an identifier of the first base station.

5. The method according to claim 1, further comprising:
   sending, by the IRP manager, a configuration parameter modify command to the first base station, wherein the configuration parameter modify command comprises a configuration parameter of the first cell and a reason for modifying the configuration parameter, wherein the reason for modification is a cause value of the cell outage or a cause value indicating that the modification is different from modifications caused by non-cell outages.

6. The method according to claim 1, wherein before the determining, by the IRP manager, that the cell outage happens to the second cell, the method further comprises:
   sending, by the IRP manager, over the OAM northbound interface, indication information indicating that energy saving is allowed for the first cell to the first base station, wherein the indication information is energy saving compensation cell information carried in neighbor cell relation information of the first cell.

7. The method according to claim 1, wherein before the determining, by the IRP manager, that the cell outage happens to the second cell, the method further comprises:
   sending, by the IRP manager, over the OAM northbound interface, indication information indicating that energy saving is allowed for the first cell to the first base station, wherein the indication information is identifier information of allowed energy saving carried in cell attribute information of the first cell.

8. The method of claim 1, further comprising:
when learning that the cell outage of the second cell ends, sending, by the IRP manager, reason information for enabling an energy saving function to the first base station over the OAM northbound interface, wherein the reason information for enabling an energy saving function is a cause value of the solved cell outage.

9. The method according to claim 8, further comprising:
sending, by the IRP manager, over the OAM northbound interface, an identifier for enabling the energy saving function to the first base station, wherein the identifier for enabling the energy saving function is the cell identifier of the first cell or the identifier of the first base station.

10. A device, comprising
at least one memory that stores instructions; and
at least one processor configured to execute the instructions to:
determine that a cell outage happens to a second cell that takes over coverage of a first cell; and
instruct, over an operation, administration and maintenance (OAM) northbound interface, a first base station to transfer the first cell from an energy saving state to a normal state, wherein the first cell belongs to the first base station.

11. The device according to claim 10, the at least one processor is configured to: determining that the cell outage happens to the second cell by receiving a cell identifier of the second cell and cell outage indication information indicating that the cell outage happens to the second cell that are sent by the second base station, wherein the second cell belongs to a second base station.

12. The device according to claim 10, the at least one processor is configured to: instructing the first base station to transfer the first cell from the energy saving state to the normal state by sending a reason information for disabling an energy saving function to the first base station over the OAM northbound interface, wherein the reason information for disabling the energy saving function is a cause value of the cell outage.

13. The device according to claim 12, the at least one processor is further configured to: send, over the OAM northbound interface, an identifier of an object for which energy saving is disabled or configuration parameter information to the first base station, wherein the identifier of the object for which energy saving is disabled is a cell identifier of the first cell or an identifier of the first base station.

14. The device according to claim 10, the at least one processor is further configured to: send a configuration parameter modify command to the first base station, wherein the configuration parameter modify command comprises a configuration parameter of the first cell and a reason for modifying the configuration parameter, wherein the reason for modification is a cause value of the cell outage or a cause value indicating that the modification is different from modifications caused by non-cell outages.

15. The device according to claim 10, wherein before determining that the cell outage happens to the second cell, the at least one processor is further configured to:
send, over the OAM northbound interface, indication information indicating that energy saving is allowed for the first cell to the first base station, wherein the indication information is energy saving compensation cell information carried in neighbor cell relation information of the first cell; or
the indication information is identifier information of allowed energy saving carried in cell attribute information of the first cell.

16. The device according to claim 10, wherein before determining that the cell outage happens to the second cell, the at least one processor is further configured to: send, over the OAM northbound interface, indication information indicating that energy saving is allowed for the first cell to the first base station, wherein the indication information is identifier information of allowed energy saving carried in cell attribute information of the first cell.

17. The device according to claim 10, wherein if the at least one processor learns that the cell outage of the second cell ends:
reason information for enabling an energy saving function is sent over the OAM northbound interface to the first base station wherein the reason information for enabling an energy saving function is a cause value of the solved cell outage.

18. The device according to claim 17, the at least one processor is further configured to: send, over the OAM northbound interface, an identifier for enabling the energy saving function to the first base station, wherein the identifier for enabling the energy saving function is the cell identifier of the first cell or the identifier of the first base station.

* * * * *